United States Patent [19]
Dolgov et al.

[11] 3,780,864
[45] Dec. 25, 1973

[54] METHOD AND APPARATUS TO REFINE MELTS FROM SOLID IMPURITIES

[76] Inventors: Anatoly Vladimirovich Dolgov, Morskoi prospekt, 36, kv. 30; Leonid Vladimirovich Konovalov, ulitsa Permskaya, 1; Leib Benyaminovich Perkis, ulitsa Geodezicheskaya, 23, kv. 53; Stanislav Lvovich Deev, ulitsa Kirova, 80, kv. 44; Vitaly Evgenievich Dyakov, ulitsa Petukhova, 132, kv. 65; Alexandr Efimovich Semenov, ulitsa Zorge, 133, kv. 33, all of Novosibirsk; Evgeny Teodorovich Bauer, Fergana, poselok Kirgili, ulitsa Shirotnaya, 21 4, kv. 23, Fergana; Serafim Nikolaevich Suturin, ulitsa Savvy Kozhevnikova, 2, kv. 22, Novosibirsk, all of U.S.S.R.

[22] Filed: Jan. 26, 1972

[21] Appl. No.: 220,847

[30] Foreign Application Priority Data
Mar. 31, 1971 U.S.S.R. .............................. 1636140
Mar. 2, 1971 U.S.S.R. .............................. 1629152
Nov. 20, 1967 U.S.S.R. .............................. 1197564
Nov. 4, 1969 U.S.S.R. .............................. 1374168

[52] U.S. Cl. ................. 210/152, 210/242, 210/370
[51] Int. Cl. ...................... B01d 35/02, B01d 35/18
[58] Field of Search ..................... 75/93, 63, 77, 78, 75/70, 86, 68; 210/370, 152, 251, 77, 78, 488, 242

[56] References Cited
UNITED STATES PATENTS
686,917 11/1901 Baker................................ 210/370
2,786,755 3/1957 Paddock et al. ...................... 75/93

Primary Examiner—Frank A. Spear, Jr.
Attorney—Holman & Stern

[57] ABSTRACT

The method provides for filtration in the field of centrifugal forces generated in a filter immersed into the layer of a melt to be refined, with the solid impurities accumulating in the filter being strained from the residual melt beyond said layer of the melt to be refined.

The apparatus comprises a melt bath provided with a rotor located thereabove and having a filter rigidly attached at bottom of the rotor, and being provided with a drive for immersing said filter into the melt.

4 Claims, 9 Drawing Figures

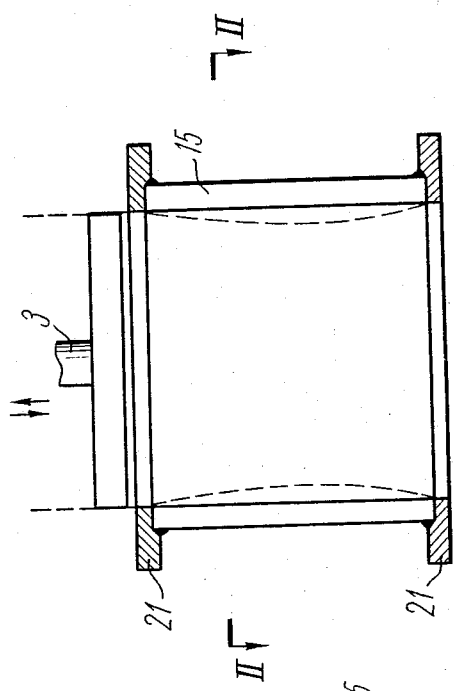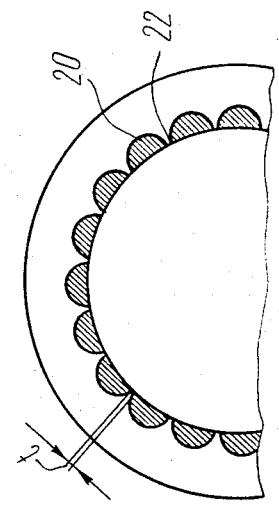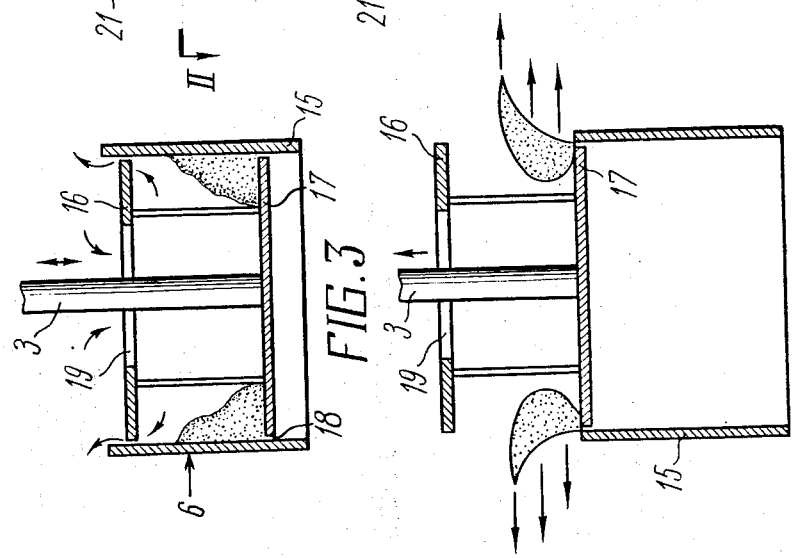

METHOD AND APPARATUS TO REFINE MELTS FROM SOLID IMPURITIES

BACKGROUND OF THE INVENTION

The invention relates to non-ferrous metallurgy and is used for refining such molten metals as tin, lead, bismuth, zinc, aluminum alloys from solid impurities, as well as for removing solid impurities from molten sulfur.

PRIOR ART

Known in the art are pyrometallurgical methods and apparatus for refining molten metals from insoluble impurities. These methods are based on gravity segregation, with the solid particles floating to the surface wherefrom they are skimmed. For example, tin is cleaned of iron by segregation after admixing carbon. Arsenic is separated from tin in the form of an aluminum compound insoluble in tin. Lead is refined from copper by segregation of copper sulfides, with the melt being treated with elementary sulfur.

In the case of segregational removal of insoluble impurities, a significant amount of metal to be refined is removed together with the skimmings, thus reducing the direct extraction of the product. In this connection, filtrational methods of metal refinement has been suggested. For example, known in practice is a method of filtrating molten sulfur from solid arsenic compounds by a ceramal filter under vacuum.

Also known are a method and an apparatus for the centrifugal filtration of metals. In this apparatus, the crude metal is poured into a rotating filter and is filtered off through slits provided in the periphery of the filter. The refined metal spills down the metal receiver, and the solid particles are arrested at the slits. The centrifugal filtration of metal in such an apparatus enables separating the insoluble impurities with a lesser loss of the base metal with skimmings as compared to the ordinary segregational methods.

However, the method and apparatus for centrifugal filtration of melts have the following disadvantages:

It is difficult to maintain the specified temperature of the filter casing and of the starting melt.

The solid particles floating to the surface of the starting melt are not uniformly poured into the apparatus, thus complicating its operation.

In the beginning of each filtration cycle, while the filter is not yet clogged with the solid sediment, the fine particles of the impurities penetrate through the filter slits and pass into the product. As the slits are being clogged, the product purity rises. Thus, the purity of the product metal is not uniform within one cycle and over the whole period of refinement.

During the operation of the apparatus, air is sucked into the rotating filter together with the metal flow which intensifies metal oxidation.

These disadvantages are caused by the fact that the filter is separated from the bulk of the metal which is fed for filtration in batches or in a flow with a varying content of the segregating impurities.

OBJECTS AND SUMMARY OF THE INVENTION

It is an object of the present invention to provide a method for refining melts from solid impurities, and an apparatus for realizing this method which secure a more complete removal of the solid impurities from the melt, and which reduce the melt losses with the filtered off solid impurities.

Another object of the invention is to depress oxidation of the melt being refined, and to ensure stable temperature conditions of the process, as well as reliable operation of the apparatus.

With these and other objects in view, in a method for refining melts from solid impurities by filtration in the field of centrifugal forces generated in the filter, according to the invention, in the course of filtration, the filter is immersed into the layer of melt being refined which is continuously admitted into the filter and, after separation of the solid impurities settling in the filter, is again admitted into said melt layer, while the solid impurities accumulating in the filter are strained off the remaining fluid melt outside said layer of the melt being refined. This secures more a complete removal of the solid impurities (including those finely divided) from the melt.

It is desirable to conduct the process of filtration with the melt temperature being lowered. This permits the refining of viscous melts with a high content of partially soluble impurities.

Advantageously, formed on the surface of the melt prior to filtration should be a layer of a liquid flux into which the filter is immersed so that the melt to be refined is admitted into the filter from under the flux layer, and the refined melt is admitted into said layer of flux, whereupon the solid impurities settled in the filter are washed to remove the remaining melt by circulating the liquid flux through the filter. This prevents oxidation of the refined melt and reduces losses of said melt with the solid sediment.

To realize this method an apparatus has been provided, such apparatus comprising a bath for the melt and a rotor at whose lower end a filter is secured coaxially therewith, the rotor being, according to the invention, disposed above the melt bath and having a drive unit for immersing the filter into the melt. This enables the refining process to be conducted directly in the melt bath, and secures stable temperature conditions of the process.

The filter in the present apparatus can be defined by two conically shaped dishes which face each other with their respective bases or bottom so as to provide a clearance therebetween constituting a filtering slits, and one of the dishes having apertures at the cone apex to admit the melt. The above arrangement simplifies the design of the filter, and provides for a high quality of filtration through regulating the size of the filtering slit.

The filter can, as well, be defined by a cylinder in which are mounted two disks arranged in parallelism to each other, the disks being capable of reciprocatory movement along the axis of the cylinder and being rigidly connected to one another, with one of the disks having an aperture to admit the melt, and the clearances between said disks and the cylinder wall constituting the filtering slits. This arrangement also simplifies the filter design, and prevents clogging of the filter in the course of its operation.

In the wall of said cylinder, along its generatrices, there can be provided filtering slits which raise the filter efficiency thereby maintaining high quality of the melt refinement.

To keep the filter below the melt level during the refining process, the filter can be suspended on a pan floating on the melt surface.

The invention is now exemplified by a description of a particular illustrative embodiment thereof with references to the appended drawings, wherein:

BRIEF DESCRIPTION OF THE DRAWINGS

FIG. 3 is a view in longitudinal section of a filter according to the invention, defined by a cylinder with disks;

FIG. 4 is a view similar to FIG. 3, in a position of discharging the solid sediment;

FIG. 5 is a view in longitudinal section of a cylinder having filtering slits,

FIG. 6 is a section taken along line II—II in FIG. 5 the view looking in the direction of the arrows;

DETAILED DESCRIPTION OF THE EMBODIMENTS

Figure 1:
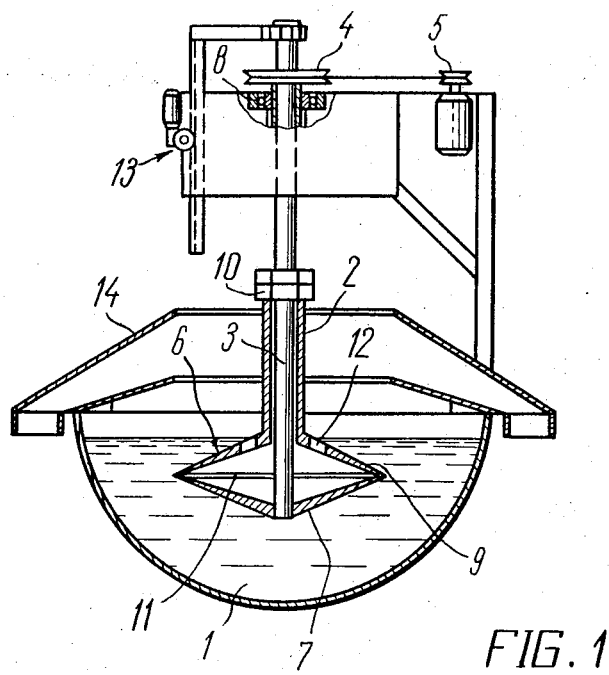
FIG. 1 is a longitudinal section of the apparatus according to the invention with a filter having two dishes.

The apparatus comprises a bath 1 (FIG. 1) with the melt, above which there is vertically mounted a rotor 2 whose shaft 3 is, through a drive 4, connected with an electric motor 5. Rigidly attached to the bottom portion of rotor 2 is a filter 6 immersed into the melt. The filter 6 comprises two conically-shaped dishes 7 and 9, whose bases or bottoms face each other. The lower dish 7 (FIG. 2) is fixed on the shaft 3 which is seated in the race of a bearing 8 via a sliding key.

The upper dish 9 is rigidly connected to the bottom portion of rotor 2, and can move along the shaft 3. The dish 9 can and be fixed in a specified position by means of a mechanism 10. The clearance between the dishes 7 and 9 defines a filtering slit 11 whose width is regulated by the mechansim 10. One of the dishes, for example, the upper dish 9, has at the apex of the cone apertures 12 to admit the melt into the filter.

The rotor 2 with the filter 6 is connected with a mechanism 13 for effecting their reciprocation along their longitudinal axis.

Fixed on the melt bath 1 is a cylindrical bin or receptacle 14 to collect the filtered off solid impurities with, the bin having a central hole to allow the filter 6 to pass therethrough.

The apparatus can be provided with a filter of a different design in which the filter 6 may comprise a hollow cylinder 15 (FIGS. 3,4) rigidly connected to the rotor 2. Within the cylinder 15 are mounted upper and lower disks 16,17 respectively which are rigidly seated on the shaft 3. The clearances between the disks 16,17 and the wall of the cylinder 15 constitute filtering slits 18. One of the disks, for example, the upper disk 16, is provided with a hole 19 to admit the melt.

The wall of the cylinder 15 (FIGS. 5,6) can be formed by round rods 20 which are peripherally fixed in flanges 21 and are spaced apart at the inner diameter of the filter 6, to form vertical clearances between the rods 20 serving as additional filtering slits 22.

Figure 7:
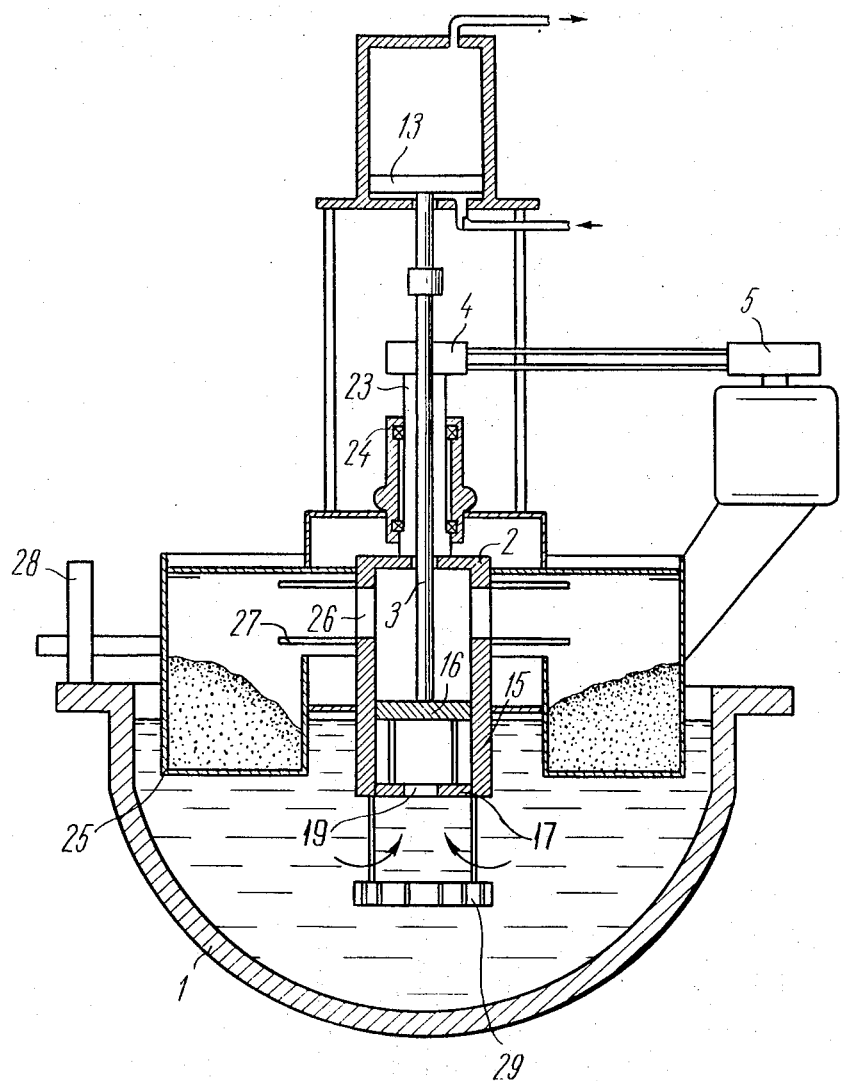
FIG. 7 is a view in longitudinal section illustrating an apparatus according to the invention with a floating pan

The shaft 3 (FIG. 7), on which are rigidly seated the disks 16,17, is connected with the drive 13 for effecting vertical reciprocatory movement, and with the drive 4 for effecting rotational movement from the electric motor 5.

To retain the filter 6 below the level of the melt, the rotor 2 is, by means of a sleeve 23 (FIG. 7) and bearings 24 attached to a pan 25 floating on the surface of the melt.

The pan 25 is a vessel whose side walls are defined by two cylinders and the pan 25 also serves to collect the filtered off solid impurities discharged therein through ports 26 along guides 27.

To prevent rotation of the pan 25, mounted on the bath 1 is a stop 28. Attached to the filter 6 can be an impeller 29 for mixing the melt.

Figure 8:
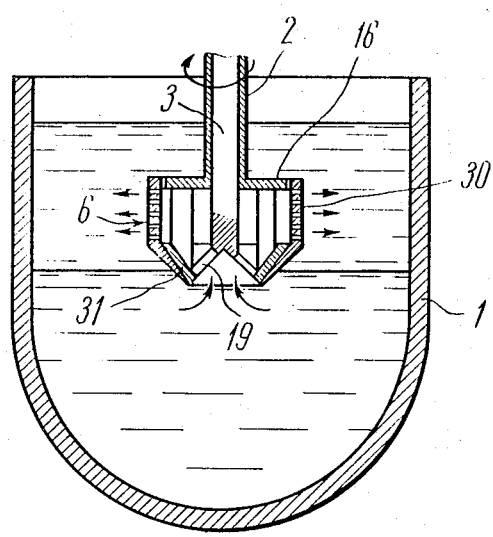
FIG. 8 is a view in longitudinal section of a filter according to the invention being immersed in flux.

In the disclosed apparatus, the filter 6 can be defined by a perforated drum 30 (FIG. 8) inside of which is placed a knife 31 rigidly connected to the disk 16 seated on the rotor 2. The knife 31 is intended to clean the filter 6 from the settled solid impurities.

Figure 2:
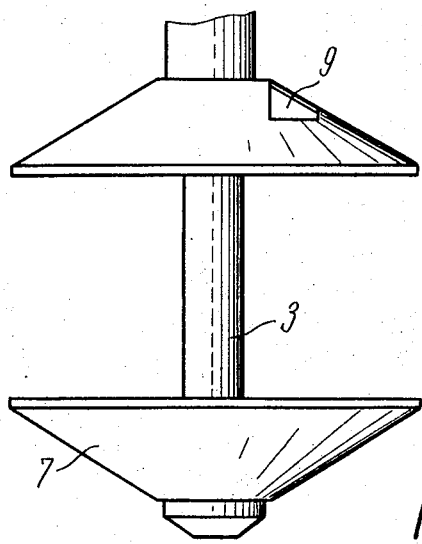
FIG. 2 is a side elevational view of a filter according to the invention with conical dishes being moved apart.

The apparatus operates as follows:

The rotating filter 6 is immersed into a heated melt bath 1 (FIG. 1). As the filter 6 rotates in the melt, the latter is, together with the solid particles entrained through the holes 12 into the filter 6.

Under the action of centrifugal forces, the fluid melt is strained out of the filter 6 through the filtering slit 11, being thus separated from the solid impurities and ejected into the rest of the melt.

Multiple circulation of the melt through the filter 6 results in a mass of solid impurities accumulating at the filtering slit 11 and, in turn, serving as a filter for the finer particles.

After the solid impurities fill the inner space of the filter 6, the latter together with the rotor 2, without stopping their rotation, are raised by the lifting mechanism 13 above the melt level, where, under the effect of centrifugal forces, the solid impurities are filtered clear of the remaining fluid melt. Then the filter 6 is lifted to the bin 14, the mechanism 10 regulating the clearance of slit 11 between the dishes 7,9 is disconnected, and the latter are taken apart (FIG. 2) to a clearance of 3–10 cm. As a result thereof the solid impurities are under the effect of centrifugal forces thrown aside into the bin 14.

Thereupon the conical dishes 7,9 are moved towards each other by activating the mechanism 10, and the filter 6 is lowered into the melt.

The cycle is repeated until the melt is sufficiently cleared from the impurities.

In the filter embodiment of FIGS. 3 and 4, the melt is, through the hole 19, sucked into the cylinder 15, from which under the effect of centrifugal forces, it is strained through the slits 18, with the solid sediment remaining inside the cylinder 15.

At this time, the disks oscillate along the walls of cylinder 15 to a length of 2–3 cm. As the disks 16,17 move down, filtration occurs mainly through the slit 18 between the lower disk 17 and the wall of cylinder 15, and when they move upward, it occurs through the slit 18 between the upper disk 16 and the wall of cylinder 15.

Thus, the filtering slits 18 are periodically cleared from the solid sediment, which results in the efficiency of the filter 6 being maintained at a constant level.

To raise the efficiency of the filter, the number of the filtering slits is increased. For example, the cylinder 15 (FIGS. 5,6) can be provided with longitudinal filtering slits 22.

After collecting in the filter a sufficient amount of solid impurities, the disks 16,17 (FIG. 7), without stopping their rotation, are lifted by the mechanism 13 up to the level of the discharge ports 26 through which under the effect of centrifugal forces, the solid impurities are thrown aside along guide disks 27 into the pan 25. To preclude rotation of the pan 25, the stop 28 is mounted on the bath.

To refine the melt from heavy impurities precipitating to the bottom, the melt is stirred by the impeller 29 fixed under the filter 6.

The present method of refining and the apparatus to realize such method can be used to refine tin from iron and arsenic, lead from copper, zinc from iron, sulfur from arsenic compounds.

When refining a metal, say, tin having a large content of partially soluble impurities (for example, arsenic), the apparatus allows conducting the process with the melt temperature being gradually reduced to about 5°–10°C above the crystallization point of the melt. For example, the refinement of molten tin at a temperature of 450°–500°C enables producing a solid sediment with a lesser content of tin (45–50 percent), since at high temperatures the metal has a small viscosity and freely passes through the filter.

However, at high temperatures (450°–500°C) the impurities are more soluble, than at low ones (250°–240°C). Hence a fouler metal is better to start filtrating at higher temperatures, and then reduce it as the proportion of impurities drops. At a temperature of 5°–10°C above the crystallization point, maximum removal of the impurities will occur.

The present apparatus permits refining molten metal from solid impurities under a liquid flux layer, for example, refining zinc from iron under a layer of zinc chloride.

Figure 9:
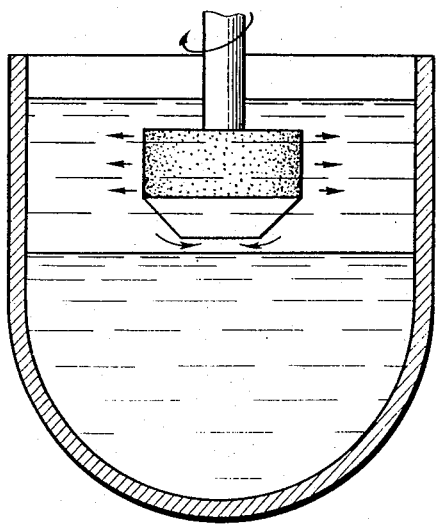
FIG. 9 is a view partly in elevation and partly in section of the filter of FIG. 8 at the moment of washing through the solid sediment by the flux.

In this case, the filter 6 (FIGS. 8,9) is immersed into molten flux, and the source melt is admitted through the inlet ports 19 from under the flux layer.

Through the inlet port 19 the melt enters the filter, from which under the action of centrifugal forces, it is strained through the filtering slits into the flux layer. After a sediment of solid impurities is accumulated inside the filter, the latter is lifted so much, that sucked through the inlet port 19 into the filter should be liquid flux which intensely washes through the sediment of solid impurities removing therefrom the residue of the melt being refined.

Thereupon, the filter is raised over the flux surface, the liquid flux is squeezed out from the sediment, and the latter is ejected in the described way.

The proposed method and apparatus permit lowering the melt losses with the solid sediment and during removal of the solid impurities from the molten metal, and in some cases reducing the consumption of reagents introduced into the melt to form insoluble impurities.

For example, the present method and apparatus make it possible to refine tin with the final product comprising 0.005% of iron, and 0.08% of arsenic, with the amount of the solid sediment being reduced by 4 to 6%, the direct extraction of tin raised by 4.78%, and the tin losses cut by 0.2%. The consumption of aluminium to refine tin from arsenic drops 2.5 times.

We claim:

1. An apparatus for refining a melt from solid impurities comprising, in combination, a bath of melt, a rotor located above the bath of melt, a drive means operably connected to the rotor for imparting rotation thereto, two conically-shaped dishes, said dishes being rigidly attached to a lower part of the rotor coaxially therewith, said dishes facing each other with their respective bottoms so as to provide therebetween a filtering slit, one of said dishes being provided at the apex with apertures through which the melt enters, and a drive unit operably connected to the dishes for immersing the dishes into the melt.

2. An apparatus for refining a melt from solid impurities comprising, in combination, a rotor located above the bath of melt, a hollow cylinder located coaxially with respect to the rotor, the cylinder being rigidly attached to a lower part of the rotor, two disks disposed in parallelism to each other within the cylinder, the disks being rigidly interconnected within the cylinder so as to be capable of reciprocating along the generatrix of the cylinder, one of said disks being provided with an aperture through which the melt is admitted, clearances between the disks and the wall of the cylinder defining filtering slits, and a drive unit operably connected to the cylinder for immersing the cylinder into the melt.

3. The apparatus as claimed in claim 2 in which filtering slits are provided in the cylinder wall along the cylinder generatrix.

4. The aparatus as claimed in claim 2 in which the cylinder is suspended on a pan floating on the surface of the melt for maintaining the cylinder below the level of the melt.

* * * * *